United States Patent
Imafuku et al.

(10) Patent No.: US 9,332,524 B2
(45) Date of Patent: May 3, 2016

(54) HALT CONTINUATION DETERMINATION METHOD AND HALT CONTINUATION DETERMINATION DEVICE

(71) Applicant: Seiko Epson Corporation, Tokyo (JP)

(72) Inventors: Shigeru Imafuku, Shiojiri (JP); Hidekazu Maezawa, Shiojiri (JP); Eiji Kinoshita, Matsumoto (JP)

(73) Assignee: Seiko Epson Corporation (JP)

( * ) Notice: Subject to any disclaimer, the term of this patent is extended or adjusted under 35 U.S.C. 154(b) by 92 days.

(21) Appl. No.: 13/957,731

(22) Filed: Aug. 2, 2013

(65) Prior Publication Data

US 2014/0045519 A1 Feb. 13, 2014

(30) Foreign Application Priority Data

Aug. 7, 2012 (JP) ................... 2012-175310

(51) Int. Cl.
*H04W 64/00* (2009.01)
*G01S 19/35* (2010.01)
*G01S 19/52* (2010.01)

(52) U.S. Cl.
CPC ............. *H04W 64/006* (2013.01); *G01S 19/35* (2013.01); *G01S 19/52* (2013.01)

(58) Field of Classification Search
CPC ..... H04W 64/00; H04W 4/028; H04W 4/027; H04W 64/006; G08G 1/0104; H04L 67/18; G01S 5/14; A63B 2220/12; A63B 2220/14
See application file for complete search history.

(56) References Cited

U.S. PATENT DOCUMENTS

| | | | |
|---|---|---|---|
| 6,246,361 B1 * | 6/2001 | Weill et al. | 342/357.57 |
| 2006/0149684 A1 * | 7/2006 | Matsuura et al. | 705/65 |
| 2006/0259241 A1 * | 11/2006 | Nylen | 701/216 |
| 2007/0239347 A1 * | 10/2007 | Watanabe et al. | 701/200 |
| 2008/0071465 A1 * | 3/2008 | Chapman et al. | 701/117 |
| 2009/0125321 A1 * | 5/2009 | Charlebois et al. | 705/1 |
| 2011/0177832 A1 * | 7/2011 | Huang | 455/457 |

FOREIGN PATENT DOCUMENTS

| | | |
|---|---|---|
| JP | 2002-074591 A | 3/2002 |
| JP | 2003-337047 A | 11/2003 |
| JP | 2007-183752 A | 7/2007 |

* cited by examiner

*Primary Examiner* — Vladimir Magloire
*Assistant Examiner* — Ernest Tacsik
(74) *Attorney, Agent, or Firm* — Harness, Dickey & Pierce, P.L.C.

(57) ABSTRACT

A location of a mobile unit is intermittently measured based on a GPS satellite signal. A halt start time zone (first halt determination region) is set based on the measured location of the mobile unit when the determination is started. An each time zone (second halt determination region) is updated and set by accumulated averaging processing (statistical processing) of results of location measurements in the past. Whether or not the halt state of the mobile unit is continued is determined using whether or not the newly measured location of the mobile unit is contained in any one of the set halt determination regions.

17 Claims, 10 Drawing Sheets

| ZONE TYPE | ZONE SETTING CONDITION |
|---|---|
| HALT START TIME ZONE (FIRST HALT DETERMINATION REGION) | ZONE UNSET & HALT DETERMINATION RESULT "TRAVEL" → "HALT" |
| EACH TIME ZONE (SECOND HALT DETERMINATION REGION) | UPDATED AND SET AT EACH TIME FROM SETTLEMENT OF HALT |
| HISTORY ZONE (THIRD HALT DETERMINATION REGION) | UNIT TIME ELAPSED |
| LOCATION SKIP TIME ZONE (FOURTH HALT DETERMINATION REGION) | LOCATION SKIP CONDITION SATISFIED |

FIG. 1

| CONDITION | JUDGMENT |
|---|---|
| MEASUREMENT LOCATION WITHIN ANY ONE OF ZONES & APPROXIMATE DIRECTION CONTINUATION CONDITION UNSATISFIED | HALT CONTINUATION |
| (A) MEASUREMENT LOCATION WITHOUT ANY ONE OF ZONES OR (B) MEASUREMENT LOCATION WITHOUT ANY ONE OF ZONES & APPROXIMATE DIRECTION CONTINUATION CONDITION SATISFIED | HALT STATE END (TRAVEL) |

FIG. 2

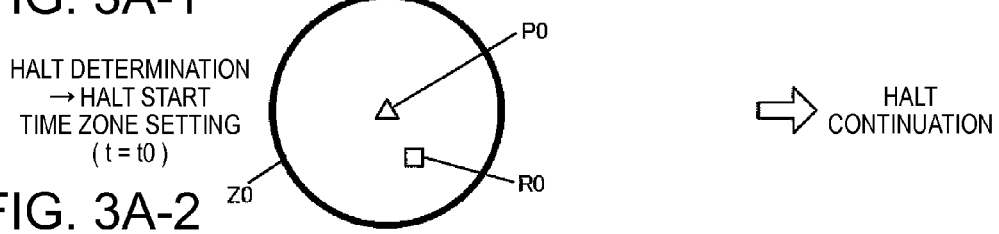
FIG. 3A-1
HALT DETERMINATION
→ HALT START
TIME ZONE SETTING
( t = t0 )
⇒ HALT CONTINUATION
FIG. 3A-2
HALT DETERMINATION
( t = t1 ~ t4 )
→ HALT SETTLEMENT
FIG. 3B
START EACH TIME
ZONE SETTING
( t = t5 )
⇒ HALT CONTINUATION
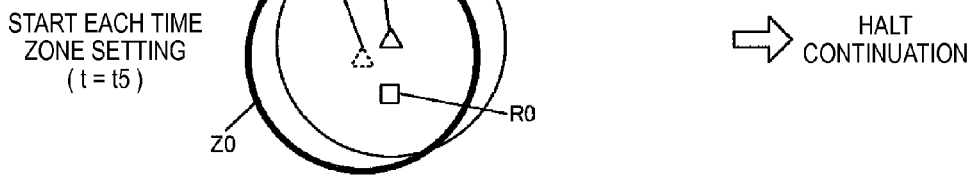
FIG. 3C
EACH TIME
ZONE SETTING
( t = t6 )
⇒ HALT CONTINUATION
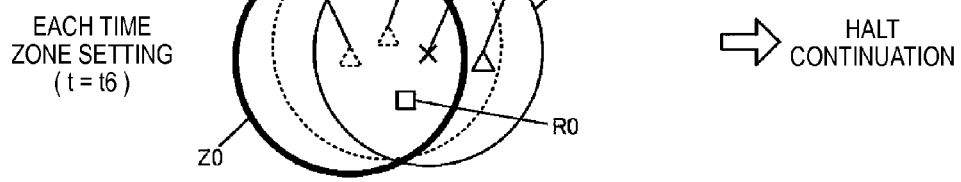
FIG. 3D
EACH TIME
ZONE SETTING
( t = t7 )
⇒ HALT CONTINUATION
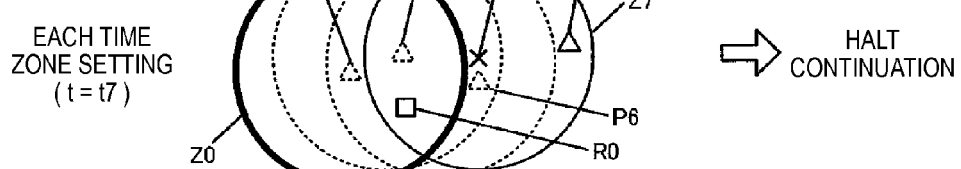
FIG. 3E
EACH TIME
ZONE SETTING
( t = t8 )
⇒ HALT STATE END
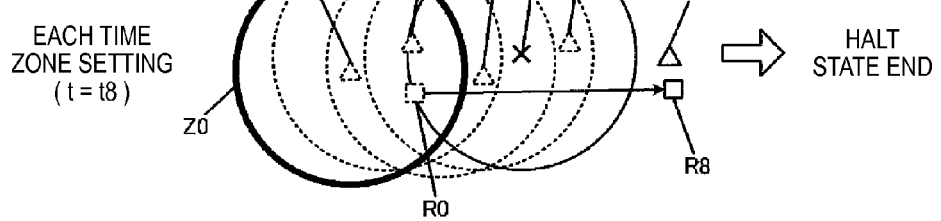

FIG. 8A

HALT START TIME ZONE DATA  _921_

| ZONE CENTER LOCATION | ZONE RADIUS |
|---|---|
| (Xs,Ys) | Rs |

FIG. 8B

EACH TIME ZONE DATA  _923_

| ZONE CENTER LOCATION | ZONE RADIUS |
|---|---|
| (X,Y) | R |

FIG. 8C

ACCUMULATED ZONE DATA  _925_

| ZONE CENTER LOCATION | ZONE RADIUS |
|---|---|
| (Xa1,Ya1) | Ra1 |
| (Xa2,Ya2) | Ra2 |
| (Xa3,Ya3) | Ra3 |
| ⋮ | ⋮ |
| (Xa10,Ya10) | Ra10 |

OLD ↑ / NEW ↓

93

| RECEPTION SIGNAL STRENGTH (931) | ZONE RADIUS (933) |
|---|---|
| $P \leq P1$ | R1 |
| $P1 < P \leq P2$ | R2 |
| $P2 < P \leq P3$ | R3 |
| ⋮ | ⋮ |

SMALL ↑ ... ↓ LARGE $R1 > R2 > R3 > \cdots$

| RECEPTION SIGNAL STRENGTH (941) | LOCATION CHANGE DIRECTION THRESHOLD VALUE (943) |
|---|---|
| $P \leq P1$ | $\theta 1$ |
| $P1 < P \leq P2$ | $\theta 2$ |
| $P2 < P \leq P3$ | $\theta 3$ |
| ⋮ | ⋮ |

SMALL ↑ ... ↓ LARGE $\theta 1 > \theta 2 > \theta 3 > \cdots$

FIG. 10

HALT CONTINUATION DETERMINATION METHOD AND HALT CONTINUATION DETERMINATION DEVICE

This application claims priority to Japanese Patent Application No. 2012-175310, filed Aug. 7, 2012, the entirety of which is hereby incorporated by reference.

BACKGROUND

1. Technical Field

The present invention relates to a halt continuation determination method or the like.

2. Related Art

A technology of determining whether or not a mobile unit is halted based on a change over time of a measurement location measured using a satellite positioning system represented by a GPS (Global Positioning System) has been known. For example, JP-A-2002-74591 has disclosed a technology of comparing the latest measurement location measured using a GPS with a measurement location measured one time ago and, if the measurement locations are the same or the distance between the measurement locations is shorter than a predetermined threshold value, determining that a mobile unit is halted.

Devices (for example, GPS receivers) that measure locations using the satellite positioning system are mounted on various electronic apparatuses and, among them, for example, in consideration of a device (for example, a running watch) that measures and displays a travel distance of a mobile unit, determination of the halt state of the mobile unit is extremely important. If the mobile unit is actually halted, but determined as being traveling, that appears as an error in the travel distance. The difficulty in determination that the mobile unit continues the halt state is problematic.

In the satellite positioning system such as a GPS, the reception environment and the reception status of satellite signals change at all times, and it is difficult to obtain a accurate location with no error. This applies to the so-called fixed-point positioning and, even when the mobile unit is halted, it is difficult to obtain a measurement location that coincides with the halt location by computation and the measurement location mostly varies.

In the case where the technology disclosed in JP-A-2002-74591 is applied to the continuation determination of the halt state without change, if the location change is smaller than the threshold value, the continuation of halt is certainly determined. However, the distance as the location change is accumulatively added, and thus, the travel distance increases in spite of the halt. However, if the location change smaller than the threshold value is not added, a problem that the travel distance hardly changes in the traveling by foot arises.

SUMMARY

An advantage of some aspects of the invention is to propose a new method for more accurate determination as to whether or not a halt state of a mobile unit is continued.

A first aspect of the invention is directed to a halt continuation determination method, including intermittently measuring a location of a mobile unit based on a satellite signal, setting a first halt determination region based on the location of the mobile unit when the determination is started, updating a second halt determination region by statistical processing of results of the measuring in the past, and determining whether or not a halt state of the mobile unit is continued using whether or not a newly measured location of the mobile unit is contained in any one of the first halt determination region and the second halt determination region.

As another aspect, the invention may be configured as a halt continuation determination device, including a measurement unit that intermittently measures a location of a mobile unit based on a satellite signal, a first setting unit that sets a first halt determination region based on the location of the mobile unit when the determination is started, a second setting unit that updates a second halt determination region by statistical processing of measurement results in the past by the measurement unit, and a determination unit that determines whether or not a halt state of the mobile unit is continued using whether or not the location of the mobile unit newly measured by the measurement unit is contained in any one of the first halt determination region and the second halt determination region.

In the case where the location of the mobile unit is measured based on the satellite signal, even when the mobile unit is actually halted, the measurement location varies depending on the reception status of the satellite signals. Therefore, according to the first aspect of the invention or the like, two kinds of halt determination regions are set and whether or not the halt state of the mobile unit is continued is determined using whether or not the newly measured location of the mobile unit is contained in any one of the two halt determination regions.

The first halt determination region is a halt determination region set based on the location of the mobile unit when the determination as to whether or not the halt state of the mobile unit is continued is started. This is the halt determination region set based on the consideration that the location of the mobile unit when the determination is started is a reference location and estimation that the measurement location may vary near the reference location. The second halt determination region is a halt determination region updated by statistical processing of measurement results in the past. As the statistical processing, for example, accumulated averaging processing of accumulatively averaging the past measurement results may be applied. In this case, the halt determination region may be set to follow the change over time of the measurement location, and thus, the measurement location may be captured by the second halt determination region even when the measurement location is slightly fluctuated. The two kinds of halt determination regions are used in this manner, and thereby, whether or not the halt state of the mobile unit is continued may be determined more accurately.

As a second aspect of the invention, the halt continuation determination method of the first aspect of the invention may be configured such that the halt continuation determination method includes the updating the second halt determination region including updating the second halt determination region by performing the statistical processing of results of the measuring in a given period retroactively from a time of the updating.

If the statistical processing is performed on all of the past measurement locations, it is likely that the second halt determination region may not completely follow the latest measurement location. Therefore, like in the second aspect of the invention, the second halt determination region is set by the statistical processing on the results of the measuring in the given period retroactively from the time of updating, and thereby, the second halt determination region may be allowed to follow the measurement location without any significant delay.

As a third aspect of the invention, the halt continuation determination method of the second aspect of the invention may be configured such that the halt continuation determination method further includes setting a second halt determination region updated at a given time to remain as a third halt determination region.

The second halt determination region is updated, however, according to the third aspect of the invention, a second halt determination region set at the given time is set to remain as the third halt determination region. When the location measurement is continued based on the satellite signals at a fixed point, there is a tendency that the directions of the variations of the measured locations are relatively the same direction. Accordingly, the second halt determination region that has been set in the past is set to remain as the third halt determination region, and thereby, the possibility that the continuation of the halt state may be correctly determined even when the measurement location varies during halt is improved.

As a fourth aspect of the invention, the halt continuation determination method of the third aspect of the invention may be configured such that the halt continuation determination method further includes the updating the second halt determination region includes changing a target period of the statistical processing at each time when the time comes.

According to the fourth aspect of the invention, the third halt determination regions remain at the times. Accordingly, it is preferable that, as the target period of the statistical processing for updating and setting the second halt determination region, for example, the period before the time is removed from the target of the statistical processing and the period after the time is set as a new target of the statistical processing.

As a fifth aspect of the invention, the halt continuation determination method of any of the first to fourth aspects of the invention may be configured such that the measuring includes measuring a travel speed of the mobile unit using Doppler of the satellite signal, and the halt continuation determination method further includes detecting a result of the measuring that does not satisfy an adaptation condition showing that a change of the location of the mobile unit and the travel speed of the mobile unit are adaptable to each other, and setting a fourth halt determination region based on the location of the mobile unit detected at the detecting.

According to the fifth aspect of the invention, the travel speed of the mobile unit is measured using Doppler of the satellite signals. In the case where the change of the location of the mobile unit and the travel speed of the mobile unit are not adaptable to each other, the so-called location skip that the measurement location largely varies over the assumed fluctuations may occur. It may be impossible to capture the measurement location by location skip in the halt determination regions. Accordingly, the fourth halt determination region is set based on the location of the mobile unit measured when the adaptation condition is not satisfied. Thereby, the halt determination region in consideration of the occurrence of position skip may be set and the accuracy of the halt continuation determination may be improved.

As a sixth aspect of the invention, the halt continuation determination method of any of the first to fifth aspects of the invention may be configured such that the halt continuation determination method includes determining including, if the newly measured location of the mobile unit is contained in any one of the first halt determination region and the second halt determination region, and an approximate direction continuation condition showing that directions of location changes of the mobile unit based on the results of the measuring are aligned in a predetermined period is satisfied, judging that the halt state of the mobile unit is ended, and, if the newly measured location of the mobile unit is contained in any one of the set halt determination regions and the approximate direction continuation condition is not satisfied, judging that the halt state of the mobile unit is continued.

In the case where the directions of location changes of the mobile unit based on the measurement results are aligned in the predetermined period, it may be estimated that the mobile unit is traveling. Accordingly, according to the sixth aspect of the invention, even in the case where the newly measured location of the mobile unit is contained in any one of the set halt determination regions, if the approximate direction continuation condition showing that directions of location changes of the mobile unit based on the measurement results are aligned in the predetermined period is satisfied, the end of the halt state of the mobile unit is judged. On the other hand, if the newly measured location of the mobile unit is contained in any one of the set halt determination regions and the approximate direction continuation condition is not satisfied, the continuation of the halt state of the mobile unit is judged.

As a seventh aspect of the invention, the halt continuation determination method of any of the first to sixth aspects of the invention may be configured such that the halt continuation determination method includes changing a size of the first halt determination region or a size of the second halt determination region using a reception signal strength of the satellite signal.

According to the seventh aspect of the invention, the size of the halt determination region is changed using the reception signal strength of the satellite signal. There is a tendency that, as the reception signal strength is weaker, the correctness of the location measurement is lower. Accordingly, for example, as the reception signal strength is weaker, the halt determination region is made larger, and thereby, even when the measurement location largely varies, the measurement location may be reliably captured in the halt determination region.

As an eighth aspect of the invention, the halt continuation determination method of any of the first to seventh aspects of the invention may be configured such that the halt continuation determination method further includes, in the case where the halt state of the mobile unit is determined to be continued by the determining, if the measured locations of the mobile unit converge in a predetermined range within a predetermined halt determination region included in the first halt determination region or the second halt determination region, releasing the other set halt determination region than the predetermined halt determination region.

In the case where the mobile unit is halted, there is a tendency that, if the location measurement environment becomes better, the measurement locations converge in the predetermined range within the predetermined halt determination region. Therefore, according to the eighth aspect of the invention, in the case where the continuation of the halt state of the mobile unit is determined, if the measured locations of the mobile unit converge in the predetermined range within the predetermined halt determination region of the set halt determination regions, the other set halt determination region than the predetermined halt determination region is released. Thereby, for example, in the case where the mobile unit starts to travel after the location measurement environment becomes better, the erroneous determination that the halt of the mobile unit continues because the measurement location enters the previously set zone again may be prevented.

BRIEF DESCRIPTION OF THE DRAWINGS

The invention will be described with reference to the accompanying drawings, wherein like numbers reference like elements.

FIG. 1 is an explanatory diagram of zone setting conditions.

FIG. 2 is an explanatory diagram of halt continuation determination conditions.

FIGS. 3A-1 to 3E are explanatory diagrams of a principle of zone setting.

FIG. 8A shows a data configuration example of halt start time zone data. FIG. 8B shows a data configuration example of each time zone data. FIG. 8C shows a data configuration example of accumulated zone data.

FIG. 9 shows a data configuration example of zone radius determination data.

FIG. 10 shows a data configuration example of location change direction threshold determination data.

DESCRIPTION OF EXEMPLARY EMBODIMENTS

Figure 4:
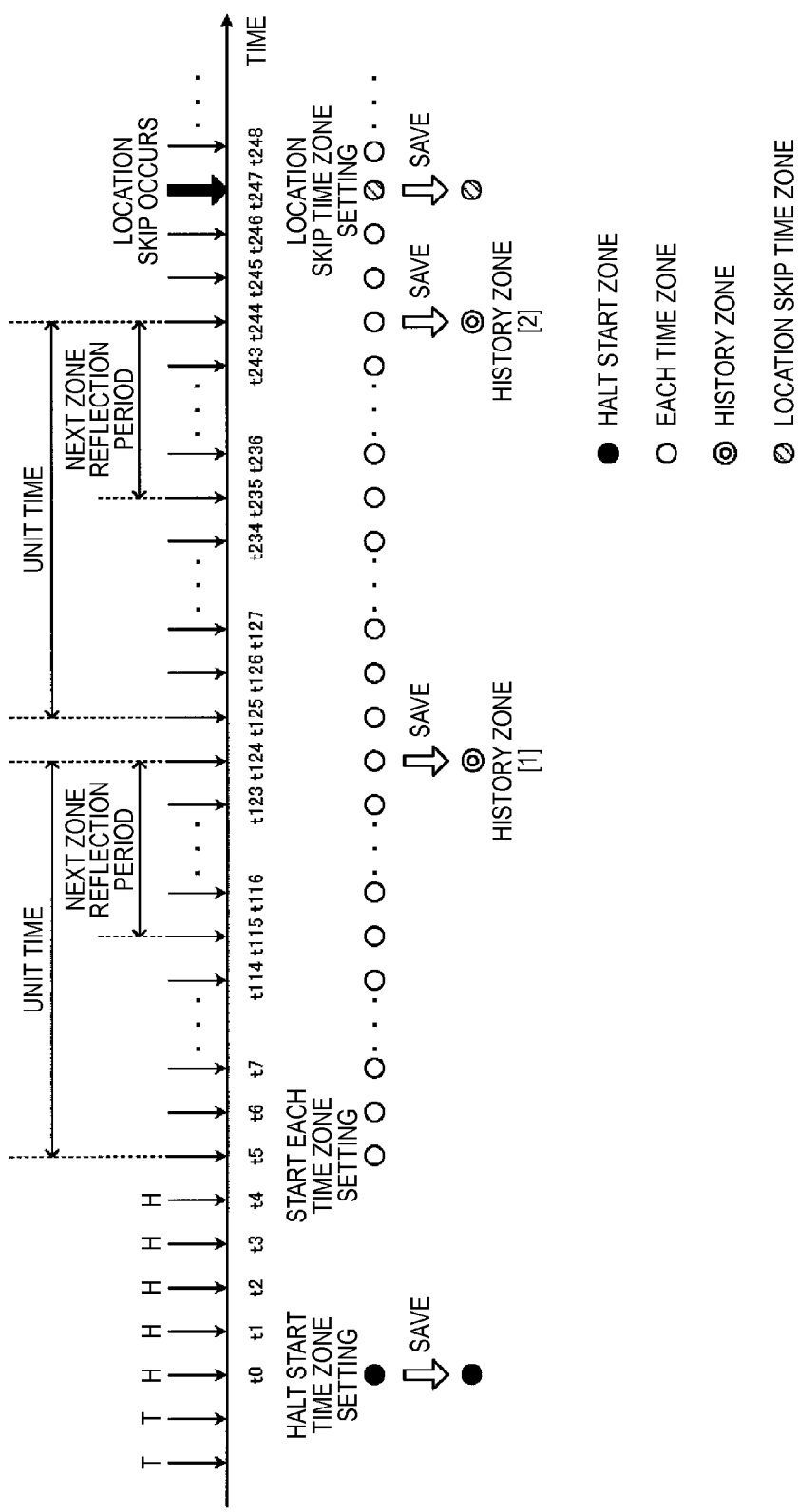
FIG. 4 is an explanatory diagram of the principle of zone setting.

As below, an example of a preferred embodiment to which the invention is applied will be explained. The embodiment is intended to perform halt continuation determination of determining whether or not a halt state of a mobile unit is continued. In the embodiment, the location of the mobile unit is measured using a GPS as a kind of satellite positioning system. Then, halt determination regions are set based on the measurement locations, and whether or not the halt state of the mobile unit is continued is determined using whether or not the newly measured measurement location of the mobile unit is contained in any one of the halt determination regions. Obviously, the embodiment to which the invention is applicable is not limited to the embodiment to be explained as below.

1. Principle

A halt continuation determination method in the embodiment will be explained. In the embodiment, the halt continuation determination for a mobile unit with a GPS receiver that computes the location and the travel speed using GPS satellite signals received from a GPS satellite as a kind of positioning satellite signals is performed. The mobile unit includes various mobile units such as a human, an automobile, and a bicycle.

The GPS receiver is adapted to intermittently measure the location, the travel speed, and the travel direction using the GPS satellite signals received from the GPS satellite. The travel speed and the travel direction will be comprehensively explained as a travel speed vector. As a general rule, "travel speed" simply refers to the speed of travel (scalar quantity). That is, the travel speed refers to "Speed" and the travel speed vector refers to "Velocity".

In the embodiment, the GPS receiver provided in the mobile unit intermittently measures the location and the travel speed vector at intervals of one second. The location of the mobile unit may be measured by known location computation using information of locations of a plurality of GPS satellites, pseudo-distances to the respective GPS satellites, etc. The pseudo-distance may be computed using phase of spread codes (code phase) of the GPS satellite signals received from the GPS satellite.

Further, the travel speed vector may be measured using Doppler of the GPS satellite signals. More specifically, Doppler is generated because of changes in relative position, i.e., relative speed of the GPS satellite and the GPS receiver. The Doppler is projection of the relative speed vector of the GPS receiver and the GPS satellite in a direction of the line of sight from the GPS receiver to the GPS satellite. Therefore, the travel speed vector of the GPS receiver may be computed using the Doppler.

In the embodiment, a plurality of halt determination regions are set, and whether or not the mobile unit continues halt using whether or not the measurement location of the mobile unit is contained in any one of the halt determination regions. In the embodiment, the halt determination region will be referred to as "zone" for explanation.

In the GPS, a three-dimensional location may be computed by three-dimensional positioning, however, in the embodiment, the location component in the altitude direction of the three-dimensional location components is not considered, and attention is focused on the two-dimensional location components expressed by latitude and longitude for explanation. That is, in the embodiment, a measurement location refers to a two-dimensional measurement location and a zone refers to a two-dimensional zone.

FIG. 1 is an explanatory diagram of zone types and zone setting conditions showing a table in which the zone types are associated with the zone setting conditions. There are four types of zones of a halt start time zone as a first halt determination region, an each time zone as a second halt determination region, a history zone as a third halt determination region, and a location skip time zone as a fourth halt determination region.

The halt start time zone is a zone set based on the location of the mobile unit when the halt continuation determination is started, and, as its setting condition, a condition that the zone is not set and the halt determination result changes from travel to halt is defined. The halt start time zone is set because the measurement location tends to vary near the approximate location where the mobile unit is halted (halt location). Further, the measurement location is displaced away from the halt location, and then, may return to the location near the halt location again. Accordingly, the halt location is used as a reference location, and a zone containing the reference location is set and the zone is set to remain as a reference zone.

For halt continuation determination, it is necessary to determine whether or not the mobile unit is halted. Accordingly, whether or not the mobile unit is halted is determined using a predetermined halt determination method. As a halt determination method in this case, various methods may be applied and, for example, there is a method of performing threshold determination with respect to the travel speed obtained from the measured travel speed vector. Specifically, the threshold determination with respect to the measured travel speed is performed and, if the travel speed is equal to or more than a predetermined threshold value, "travel" is determined and, if the travel speed is less than the predetermined threshold value, "halt" is determined.

The each time zone is a zone in which the past location measurement results of the mobile unit are statistically processed and updated and set with respect to each one time, and, as its setting condition, each time is defined from the halt settled time. Here, "one time" refers to every time when the location is computed and, for example, times at intervals of one second. Further, in the embodiment, the statistical processing is explained as accumulated averaging processing of accumulatively averaging the past location measurement results of the mobile unit. That is, the past measurement locations are accumulatively averaged and the each time zone is updated and set based on the resulting location (accumulated average location).

The history zone is a zone in which the each time zones set at given times are set to remain and, as its setting condition, a condition that a unit period elapses is defined. The zones updated and set with respect to each one time are set to remain at predetermined times and they are accumulated as the history zones.

The location skip time zone is a zone set when the so-called location skip occurs and, as its setting condition, a condition that a location skip condition is satisfied is defined. The location skip refers to wide fluctuations of the location measured based on the GPS satellite signals exceeding an amount of assumed fluctuations. A significant error is momentarily mixed in measurement information (for example, code phase) necessary for location computation, and thereby, a large skip (so-called jump) may momentarily occur in the location to be measured. The location skip is detected and the location skip time zone is set at the detection.

The detection of location skip may be realized by detecting obtainment of the measurement location that does not fulfill an adaptation condition as a condition showing that the change of the location of the mobile unit and the travel speed of the mobile unit are adaptable to each other. For example, the distance between the measurement location at this time (current time) and the measurement location at the previous time (one time ago) is computed, and thereby, the travel distance of the mobile unit between the measurement times (to be explained as "first travel distance") may be estimated.

Further, on the other hand, the measured travel speed and the time intervals of location computation are used, and thereby, the travel distance of the mobile unit between the measurement times (to be explained as "second travel distance") may be estimated. The first travel distance and the second travel distance estimated using the different methods are compared and, if the first travel distance and the second travel distance deviate from each other to a certain degree, a determination that a location skip has occurred may be made.

FIG. 2 is an explanatory diagram of a determination method for halt continuation determination showing a table in which conditions and judgments are associated with each other. As a condition for determination of halt continuation, "measurement location is within any one of zones and approximate direction continuation condition is not satisfied" is defined. Further, as a condition for judgment of the end of the halt state (travel), (A) a condition that the measurement location is not contained in any one of the zones, or (B) a condition that the measurement location is contained in any one of the zones and the approximate direction continuation condition is satisfied is defined.

As a general rule, if the newly measured location of the mobile unit is contained in any one of the zones, a determination that the mobile unit is continuing halt is made. However, a situation that, although the mobile unit is actually traveling, the measurement location is contained in the zone may occur. When the mobile unit is traveling, there is a tendency that the travel directions of the mobile unit are continuously aligned over a certain period. Accordingly, in the embodiment, the directions of the location changes are determined based on the sequential measurement locations and, in the case where the approximate direction continuation condition showing that the directions of the location changes of the mobile unit are aligned in the predetermined period is satisfied, if the measurement location is contained in any one of the zones, a determination that the halt state of the mobile unit has ended is made.

The travel direction of the mobile unit is obtained from the measurement locations at continuous two times. The travel direction obtained in this manner is referred to as "location change direction". The change of the location change direction over time is monitored, and threshold determination with respect to a difference between the location change directions (an absolute value of the difference between the location change directions) at two sequential times is performed. Then, for example, if the difference between the location change directions is less than the threshold value continuously at a predetermined number of times, a determination that the approximate direction continuation condition is satisfied is made.

FIGS. 3A-1 to 3E are detailed explanatory diagrams of the halt continuation determination schematically showing a flow of a series of processing from when the mobile unit is halted to when the unit starts to travel with attention focused on the halt start time zone and the each time zone. FIGS. 3A-1 to 3E show real locations of the mobile unit with rectangular plots, measurement locations with triangular plots, and average locations obtained by accumulated averaging processing of the measurement locations with x-shaped plots.

Suppose that the mobile unit is halted at time t0 shown in FIG. 3A-1. In this case, with the time t0 as the halt start time, a circular zone around measurement location P0 at time t0 is set as halt start time zone Z0. In the drawing, the halt start time zone Z0 is shown by a thick solid line. The deviation of the measurement location P0 from real location R0 is an error of location measurement. In this case, the measurement location P0 is definitely contained in the halt start time zone Z0, and a determination of halt continuation is made.

Subsequently, the halt determination is performed every second and, if determinations of halt are continuously made in a fixed period (for example, in four seconds) from the halt start time t0, a judgment that the halt of the mobile unit has been settled (halt settlement) is made. Then, setting of the each time zone is started from the next time. Note that if the result of the halt determination is "travel" only once in the fixed period from the halt start time, the halt start time zone is released and the status before setting of the zone is returned.

Here, suppose that the halt determination results are "halt" continuously from time t1 to time t4 after the halt start time t0 (FIG. 3A-2). In this case, a determination of halt settlement is made, and setting of the each time zone is started from the next time t5.

As shown in FIG. 3B, measurement location P5 is obtained at time t5. Accordingly, a circular each time zone Z5 around the measurement location P5 is set. Then, whether or not the measurement location P5 is contained in any of the halt start time zone Z0 and the each time zone Z5 is determined. In this case, the measurement location P5 is definitely contained in the each time zone Z5, and a determination of halt continuation is made.

As shown in FIG. 3C, measurement location P6 is obtained at time t6. In this case, average location A6 is obtained by accumulated averaging of the measurement location P5 at time t5 and the measurement location P6 at time t6. Then, the each time zone Z5 set one time ago is released and each time zone Z6 around the average location A6 is newly set. Then, whether or not the measurement location P6 is contained in any of the halt start time zone Z0 and the each time zone Z6 is determined. In FIG. 3C, the measurement location P6 is contained in the each time zone Z6. Accordingly, the determination of halt continuation is also made at time t6.

At time t7 in FIG. 3D, measurement location P7 is obtained. In this case, average location A7 is obtained by accumulated averaging of the measurement location P5 at time t5 to the measurement location P7 at time t7. Then, the each time zone Z6 set one time ago is released and each time zone Z7 around the average location A7 is newly set. Then, whether or not the measurement location P7 is contained in any of the halt start time zone Z0 and the each time zone Z7 is determined. In FIG. 3D, the measurement location P7 is contained in the each time zone Z7. Accordingly, the determination of halt continuation is also made at time t7.

At time t8 in FIG. 3E, the mobile unit starts to travel and the real location changes from R0 to R8. Further, measurement location P8 is obtained near the real location R8 to follow the change. In this case, average location A8 is obtained by accumulated averaging of the measurement location P5 at time t5 to the measurement location P8 at time t8. Then, the each time zone Z7 set one time ago is released and each time zone Z8 around the average location A8 is newly set. In FIG. 3E, the measurement location P8 is not contained in the halt start time zone Z0 or the each time zone Z8. Accordingly, a determination that the halt continuation of the mobile unit has ended (has started to travel) is made at time t8.

At the start of measurement using the GPS, there is a tendency that the correctness of the measured locations and the travel speed vector is lower. Accordingly, even when the mobile unit is actually halted, a value to a certain degree as the travel speed may be obtained as a measurement result. In this case, when the threshold determination with respect to the travel speed is simply performed and the travel status of the mobile unit is determined, an erroneous determination that the unit is traveling may be made though it is actually halted. Further, regarding the measurement location, it is not necessarily that the measurement location near the real location of the mobile unit is obtained by computation, but the measurement location may vary in various directions as if the mobile unit travels in various directions.

Therefore, in the embodiment, average locations by accumulated averaging of the measurement locations obtained in the temporal sequence are obtained, and each time zones around the average locations are set and updated. The zones are centered around the average locations so that the zones may be set to gradually follow the measurement locations. Even when the measurement accuracy is unstable and the measurement locations change little by little, the each zones are set to follow the changes, and thereby, the measurement locations may be captured by the each time zones.

When the mobile unit starts to travel, the measurement location changes to follow the mobile unit and, when the travel speed of the mobile unit increases to a certain degree, the each time zone hardly follows the measurement location. Accordingly, the measurement location is no longer contained in the zone, and thus, a determination that the mobile unit has started to travel may be made at the device side.

FIG. 4 is a detailed explanatory diagram of a method of setting zones. With the horizontal axis as a time axis, the flow of zone setting is shown in the temporal sequence. Arrows directed downward with respect to the time axis show computation times of locations and travel speed vectors. Further, FIG. 4 shows the halt start time zone with a black circle, the each time zones with white circles, the history zone with a double circle, and the location skip zone with a hatched circle, respectively.

At time t0, the halt start time zone is set and saved. Then, setting and updating of the each time zones are started from time t5. In the new each time zone, the average location obtained by accumulated averaging of the measurement locations in a past predetermined period retroactively from the set time is set to the center location. The maximum length of the target period for accumulated averaging is defined, and the target period for accumulated averaging is reset at each time when the maximum length is reached. In FIG. 4, the maximum length of the target period is shown as a unit period.

The first target period is started from time t5 and reset at time t124, and the start time of the target period is reset at the next time t125. Therefore, the period as the target for accumulated averaging processing is changed at each time when times at given time intervals are reached. Further, at the end time of the unit period, the each time zone set at the end time is saved. That is, the each time zones set at times at given time intervals are set to remain as the history zones.

Immediately after the target period for accumulated averaging processing is reset, only one measurement location is contained in the new target period. Then, the following inconvenience is caused. That is, a problem that the location skip of the each time zone may occur around the reset of the target period arises. For example, in FIG. 4, the average location obtained by accumulated averaging processing of the measurement locations from time t5 to time t124 is the center location of each time zone at time t124, however, just at the time t125, the measurement location at time t125 becomes the center location of the each time zone.

To avoid the problem, in the embodiment, immediately after the target period is reset, the last part of the unit period immediately before the reset (e.g., the last ten seconds) is added to the target period as a next zone reflection period. For example, in FIG. 4, at time 125 immediately after the target period is reset, the times t115 to t124 as the last part of the unit period immediately before the reset are set as the next zone reflection period, and the average location obtained by accumulated averaging processing of the measurement locations in this period and the measurement location at time t125 is set to the center of the each time zone at time t125. Note that the measurement location at time t125 is updated to be the average location. In this manner, after time t126, the measurement location at time t125 (the average location at time t125) is the target for accumulated averaging processing, and the measurement location in the next zone reflection period has an indirect effect thereon.

Further, in FIG. 4, the location skip occurs at time t247 and the above-described location skip condition is satisfied. In this case, the location skip time zone is set and saved based on the measurement location at time t247. Specifically, a zone around the measurement location where the location skip has occurred is set.

The setting of zones is performed in the above-described procedure, and the four kinds of zones of the halt start time zone, the each time zone, the history zone, and the location skip time zone are set. Only one each time zone constantly exists because the each time zone is updated and set with respect to each one time, however, when the halt start time zone, the history zone, and the location skip time zone are once set, they are not released, but remain until a zone release condition is satisfied.

Figure 5:
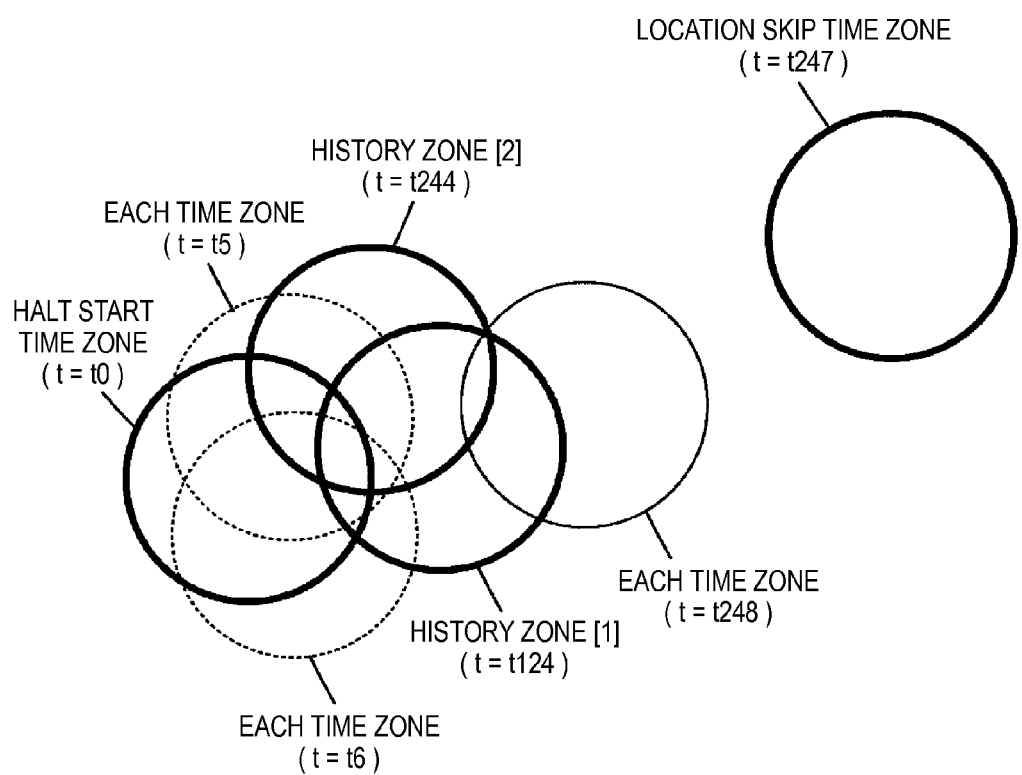
FIG. 5 is an explanatory diagram of the principle of zone setting.

For example, FIG. 5 is a schematic diagram of the zones set at time t248 in FIG. 4. The each time zone is updated with respect to each one time and only one each time zone is set at time t248, however, the other zones remain.

The zone release condition may be defined to be when a determination of halt continuation end is made, for example. That is, if a determination that the mobile unit has started to travel from the halt state is made, all of the remaining zones are deleted and the status before zone setting is returned.

2. Example

Next, an example of a halt continuation determination device that performs the halt continuation determination based on the above-described principle will be explained. Here, a running watch will be explained as an example of an electronic apparatus including a halt continuation determination device and a travel distance computation device. Note that, obviously, the example to which the invention is applicable is not limited to the example to be explained.

2-1. Appearance Configuration

Figure 6:
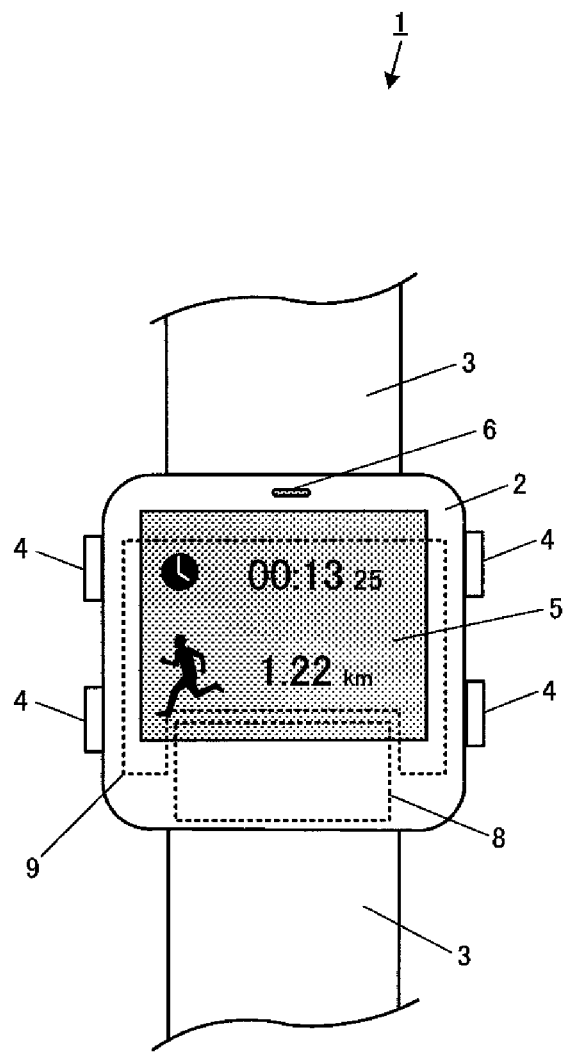
FIG. 6 shows an appearance of a running watch.

FIG. 6 shows a schematic appearance of a running watch 1 in the example. The running watch 1 is a wristable apparatus, with a human as a mobile unit, worn around a wrist of a user (right wrist or left wrist) for use, and includes a main body part 2 and a band part 3 as main component elements.

The band part 3 is a wearable piece for fixing and wearing the main body part 2 around the wrist of the user and has a known configuration. As a configuration for realization of ease of wearing of the main body part 2 at low cost, for example, a band with a hook-and-loop fastener or a contracting rubber band is considered.

The main body part 2 is a main body of the running watch 1 and includes operation buttons 4 on side surfaces, a liquid crystal display 5 in the center part of the front surface, and a speaker 6 in the upper part of the front surface, respectively. The operation buttons 4 are used for the user to input personal data and command measurement start and measurement end of a running distance. On the liquid crystal display 5, information such as a lap time and the running distance, is displayed. From the speaker 6, audio guidance, pace sound, etc. are output.

The main body part 2 contains a GPS antenna (not shown) for receiving GPS satellite signals from a GPS satellite as a kind of positioning satellite. Further, the main body part 2 contains a rechargeable battery 8 to be recharged via a charging terminal provided in a predetermined location (e.g., the side surface of the main body), and a control board 9 on which a microprocessor, a memory, a communication module, a GPS module, etc. are mounted.

2-2. Functional Configuration

Figure 7:
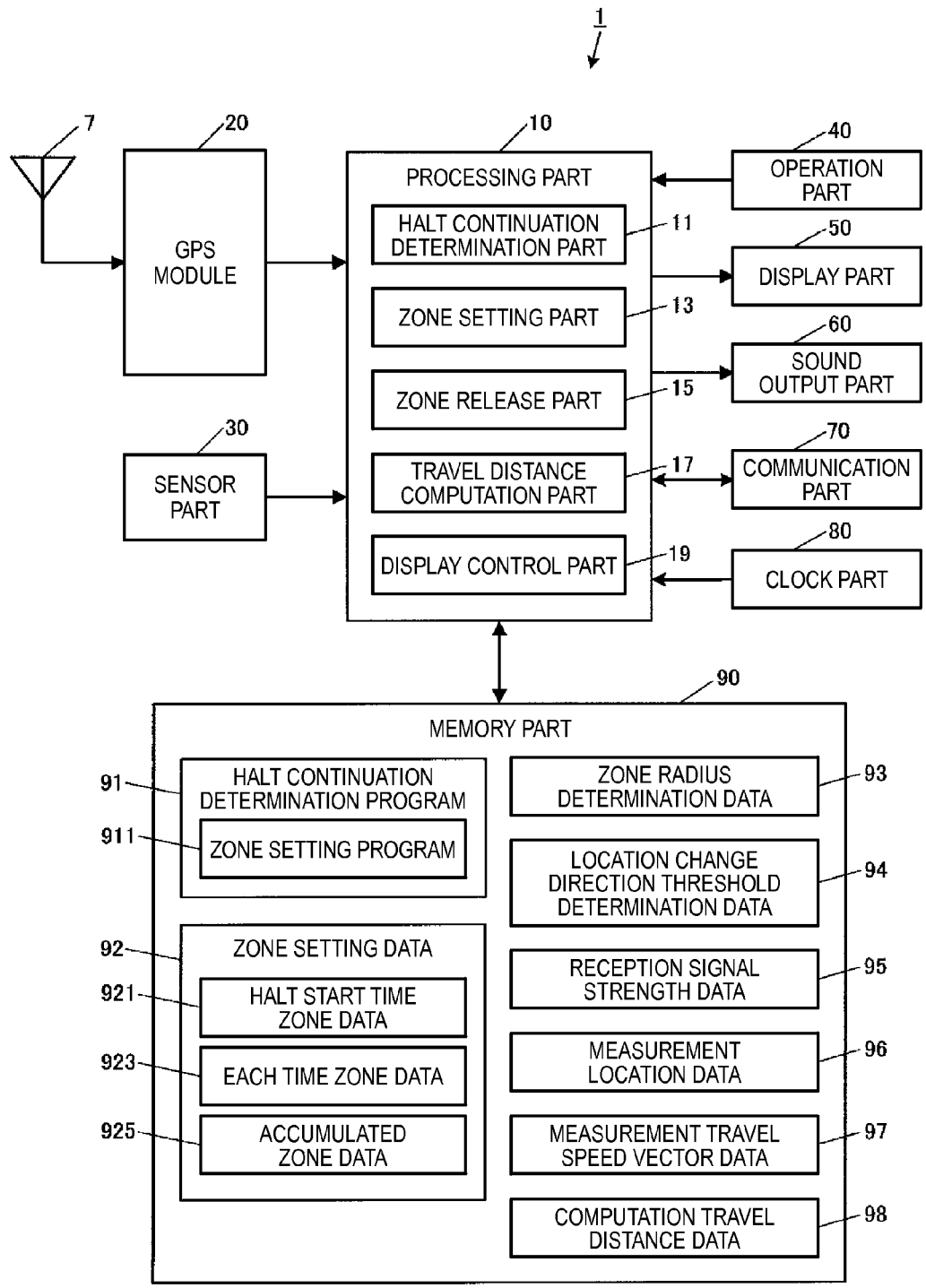
FIG. 7 is a block diagram showing a functional configuration example of the running watch.

FIG. 7 is a block diagram showing an example of a functional configuration of the running watch 1. The running watch 1 includes a GPS antenna 7, a processing part 10, a GPS module 20, a sensor part 30, an operation part 40, a display part 50, a sound output part 60, a communication part 70, a clock part 80, and a memory part 90.

The processing part 10 is a processor that generally controls the respective parts of the running watch 1 according to various programs including a system program stored in the memory part 90, and includes a processor such as a CPU (Central Processing Unit) or a DSP (Digital Signal Processor).

In the example, the processing part 10 has a halt continuation determination part 11, a zone setting part 13, a zone release part 15, a travel distance computation part 17, a display control part 19 as main functional parts. Note that these functional parts are just described as an example, and all of these functional parts are not necessarily employed as essential component elements. Further, other functional parts may be added as essential component elements.

The halt continuation determination part 11 determines whether or not the halt state of the mobile unit is continued using whether or not the location of the mobile unit newly measured by the GPS module 20 is contained any one of the zones set by the zone setting part 13.

The zone setting part 13 sets four kinds of zones of the halt start time zone (first halt determination region), the each time zone (second halt determination region), the history zone (third halt determination region), and the location skip time zone (fourth halt determination region). The zone setting part 13 corresponds to a first setting unit that sets the first halt determination region or a second setting unit that updates and sets the second halt determination region.

The zone release part 15 releases the zones set by the zone setting part 13 according to a predetermined release condition.

The travel distance computation part 17 computes the accumulated travel distance of the user based on the determination result of the halt continuation determination part 11 and uses it as the running distance of the user.

The display control part 19 performs control of allowing the display part 50 to display information including the running distance of the user computed by the travel distance computation part 17.

The GPS module 20 is a module that measures the locations and the travel speed vectors using the GPS satellite signals received by the GPS antenna 7. The GPS module 20 performs signal processing on RF (Radio Frequency) signals received by the GPS antenna 7 and captures the GPS satellite signals, and operates and acquires various quantities according to the captured GPS satellite signals (hereinafter, referred to as "measurement information").

The measurement information includes various quantities such as code phase and Doppler (also referred to as "Doppler frequency") of the signals of the received GPS satellite signals and various quantities such as pseudo distances between the running watch 1 and the GPS satellite and pseudo-distance change rates. The GPS module 20 measures the location and the travel speed vector of itself by performing known location computation and travel speed vector computation using the measurement information. The GPS module 20 corresponds to a measurement unit that intermittently measures the location of the mobile unit based on the satellite signals.

The sensor part 30 is a sensor unit including an inertial sensor such as an acceleration sensor or a gyro sensor, for example.

The operation part 40 is an input device including a touch panel, a button switch, etc., for example, and outputs signals of the pressed down keys and buttons to the processing part 10. The operation part 40 corresponds to the operation buttons 4 in FIG. 6.

The display part 50 is a display device including an LCD (Liquid Crystal Display) or the like, and performs various kinds of display based on the display signals output from the processing part 10. The display part 50 corresponds to the liquid crystal display 5 in FIG. 6.

The sound output part 60 is a sound output device including a speaker or the like and performs various kinds of sound output based on the sound output signals output from the processing part 10. The sound output part 60 corresponds to the speaker 6 in FIG. 6.

The communication part 70 is a communication device for transmitting and receiving information used within the device between an external information processing device and itself. As a communication method for the communication part 70, various methods including a method of wired connection via a cable compliant to a predetermined communication standard, a method of connection via an intermediate device also serving as a recharger called "cradle", a method of wireless connection using near field communication are applicable.

The clock part 80 is an internal clock of the running watch 1 and includes a quartz oscillator having a quartz vibrator and an oscillator circuit or the like. The timed times of the clock part 80 are output to the processing part 10 at all times.

The memory part 90 includes a memory device such as a ROM (Read Only Memory), a flash ROM, or a RAM (Random Access Memory), and stores the system program for the processing part 10 to control the running watch 1 and various programs and data for execution of various kinds of applications.

In the memory part 90, a halt continuation determination program 91 to be read out by the processing part 10 and executed as halt continuation determination processing (see FIG. 11) is stored. The halt continuation determination program 91 includes a zone setting program 911 to be executed as zone setting processing (see FIG. 12) as a subroutine. These processing will be described later in detail using flowcharts.

Further, in the memory part 90, zone setting data 92, zone radius determination data 93, location change direction threshold determination data 94, reception signal strength data 95, measurement location data 96, measurement travel speed vector data 97, and computation travel distance data 98 are stored as data.

The zone setting data 92 is data in which setting information of zones are stored, and includes halt start time zone data 921, each time zone data 923, and accumulated zone data 925.

The halt start time zone data 921 is setting data of the halt start time zone and its data configuration example is shown in FIG. 8A. In the halt start time zone data 921, the center location and the zone radius of the halt start time zone are associated and stored.

The each time zone data 923 is setting data of the each time zone and its data configuration example is shown in FIG. 8B. In the each time zone data 923, the center location and the zone radius of the each time zone are associated and stored. The each time zone data 923 is updated with respect to each one time.

The accumulated zone data 925 is data in which the history zones and the location skip zones are accumulatively stored and its data configuration example is shown in FIG. 8C. In the accumulated zone data 925, the center location and the zone radius of the set zone are associated and a predetermined number (e.g., ten pieces) of the data are stored in the temporal sequence. The accumulated zone data 925 may be formed as a ring buffer, for example, and the setting information of the old zone is deleted at each time when a new zone is added.

As has been explained with respect to the principle, the history zone is set to remain one by one at each time when the unit time elapses, and the location skip time zone is set to remain one by one at each time when the location skip condition is satisfied. Accordingly, in the case where the mobile unit is halted over a long period, it is considered that the zones increase without limitation with the lapse of time. Accordingly, the upper limit is defined for the total number of settings of the history zones and the location skip time zones in advance, and, if zone setting is performed over the total number of settings, the set zones are released in order from the old set zones.

The zone radius determination data 93 is data used for determination of the zone radius and its data configuration example is shown in FIG. 9. In the zone radius determination data 93, a reception signal strength 931 and a zone radius 933 are associated and stored.

The reception signal strength 931 is a reception signal strength of the GPS satellite signal, and, for example, a range of signal strength P of the GPS satellite signal received from the captured GPS satellite (hereinafter, referred to as "captured satellite") is defined. As the reception signal strength 931 is smaller, the larger value is set for the zone radius 933. As the reception signal strength 931 is smaller, the correctness of the location measured by the GPS module 20 becomes lower. That is, the larger variations of the measurement location are assumed, and the zone radius 933 is made larger and the set zone is made larger.

The location change direction threshold determination data 94 is data used for determination of the location change direction threshold value to be used for determination as to whether or not the directions of location changes are aligned, and an example of its data configuration is shown in FIG. 10. In the location change direction threshold determination data 94, a reception signal strength 941 and a location change direction threshold value 943 are associated and stored. The location change direction threshold value 943 is a threshold value when threshold determination with respect to the difference between the location change directions is performed.

The reception signal strength 941 is the same as the reception signal strength 931 in FIG. 9. As the reception signal strength 941 is smaller, the larger value is set by the location change direction threshold value 943. As the reception signal strength 941 is smaller, the correctness of the location measured by the GPS module 20 becomes lower. The reduction in the correctness of the measurement location is the reduction in the correctness of the location change direction obtained from the sequential measurement locations. Accordingly, the threshold value with respect to the difference between the location change directions is made larger, and thereby, the criterion for determination that the location change directions are aligned is relaxed.

The reception signal strength data 95 is data in which reception signal strengths for the respective captured satellites output from the GPS module 20 are stored.

The measurement location data 96 is data in which measurement locations output from the GPS module 20 are stored.

The measurement travel speed vector data 97 is data in which measurement travel speed vectors output from the GPS module 20 are stored.

Further, the computation travel distance data 98 is data in which an accumulative travel distance (accumulated travel distance) computed by the processing part 10 is stored.

2-3. Flow of Processing

Figure 11:
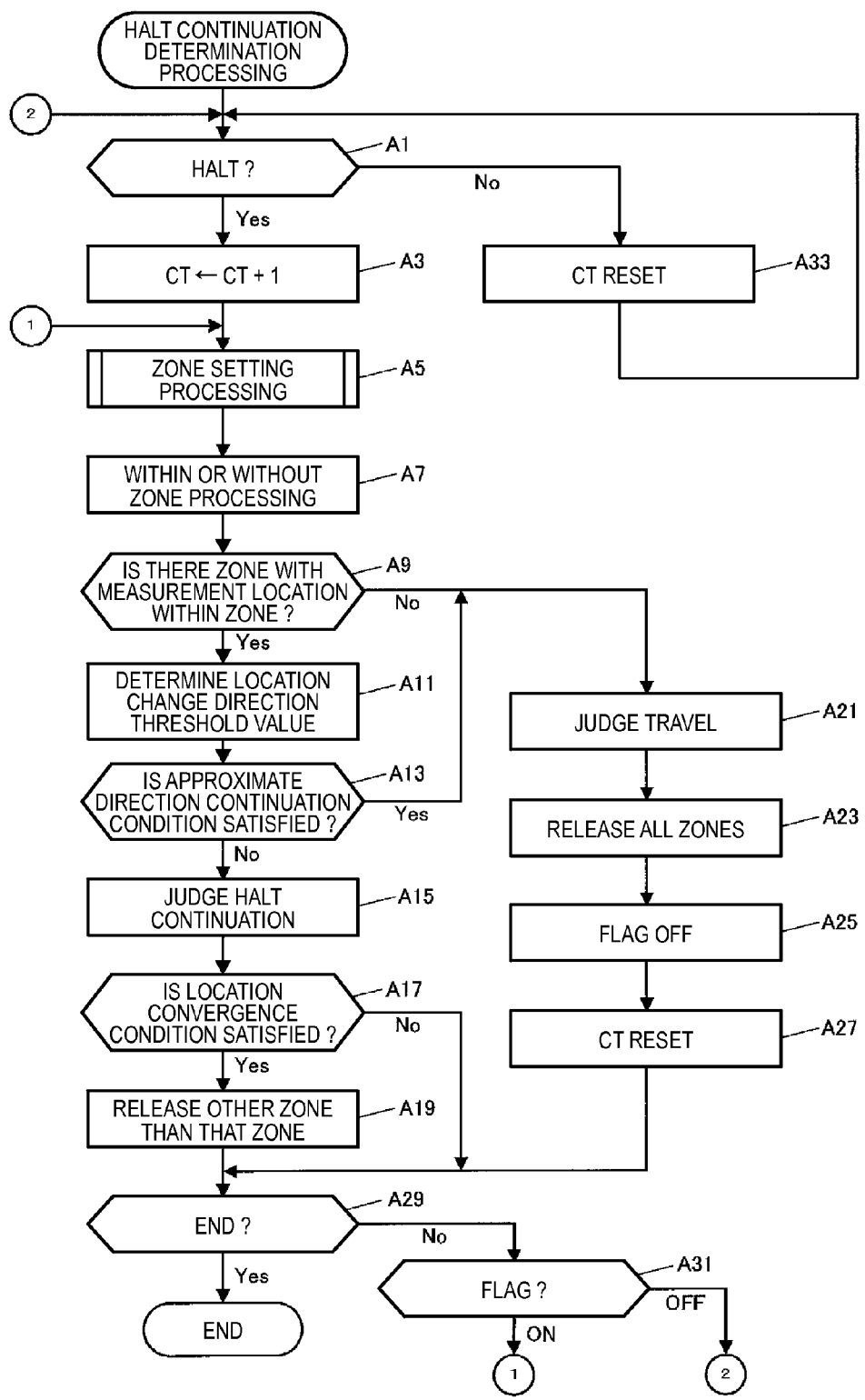
FIG. 11 is a flowchart showing a flow of halt continuation determination processing.

FIG. 11 is a flowchart showing a flow of halt continuation determination processing executed according to the halt continuation determination program 91 stored in the memory part 90. The explanation will be made, suppose that, in the halt continuation determination processing, capture of the GPS satellite signals and measurement of the locations and the travel speed vectors are performed in the GPS module 20 at all times, and the measurement results are output from the GPS module 20 at all times.

First, the halt continuation determination part 11 determines whether or not the device itself is halted by performing halt determination processing (step A1). Specifically, the part determines whether or not the device itself is halted by performing threshold determination with respect to the travel speed based on the measurement travel speed vector acquired from the GPS module 20.

Note that the halt determination may be performed not based on the travel speed measured by the GPS module 20, but based on the acceleration or the angular velocity detected by the sensor part 30. Further, the halt determination may be performed using the measurement result of the GPS module 20 and the detection result of the sensor part 30.

If halt is determined (step A1; Yes), the halt continuation determination part 11 increments counter CT (step A3), and performs zone setting processing according to the zone setting program 911 stored in the memory part 90 (step A5).

Figure 12:
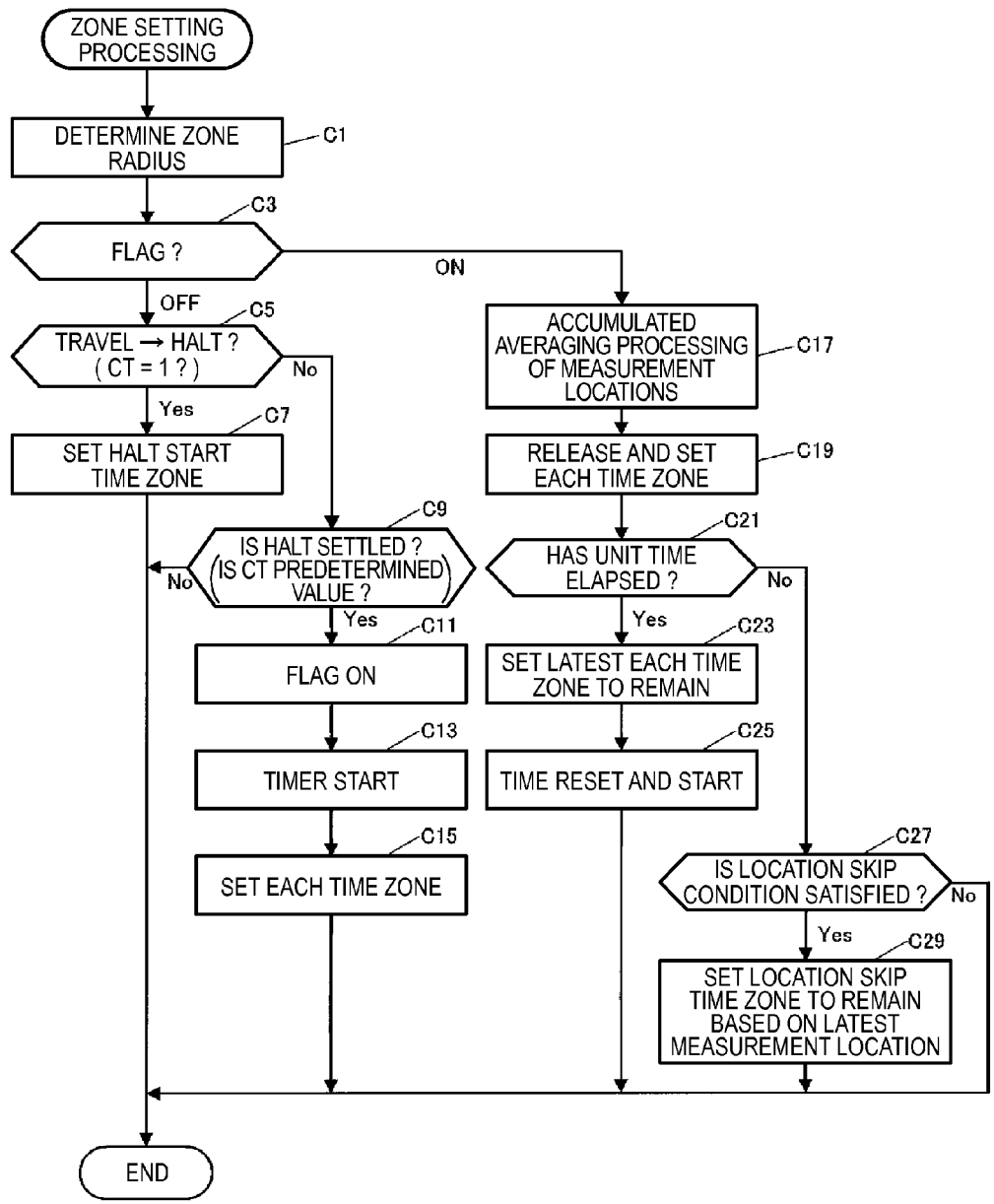
FIG. 12 is a flowchart showing a flow of zone setting processing.

FIG. 12 is a flowchart showing a flow of the zone setting processing.

The zone setting part 13 determines the zone radius (step C1). Specifically, the part refers to the zone radius determination data 93 stored in the memory part 90, reads out the zone radius 933 in response to the reception signal strength 931 acquired from the GPS module 20, and uses it as the radius of the set zone.

Then, the zone setting part 13 determines a flag (step C3). The flag is a flag set to "ON" when the halt of the mobile unit is settled, and set to "ON" at the same time as the start of setting of the each time zone. The flag is initially set to "OFF".

If a determination that the flag is OFF is made (step C3; OFF), the zone setting part 13 determines whether or not the state has been changed from travel to halt depending on whether or not the time is immediately after the halt determination at step A1, i.e., the counter CT is "1" (step C5).

If the condition is satisfied (step C5; Yes), the zone setting part 13 sets the halt start time zone (step C7). Specifically, the latest measurement location is used as the zone center location, associated with the zone radius determined at step C1, and stored in the halt start time zone data 921. Then, the zone setting part 13 ends the zone setting processing.

If a determination that the condition is not satisfied at step C5 is made (step C5; No), the zone setting part 13 determines whether or not the halt has been settled depending on whether or not the counter CT reaches a predetermined value (step C9). If the halt has not been settled (step C9; No), the zone setting part 13 ends the zone setting processing.

On the other hand, if the halt has been settled (step C9; Yes), the zone setting part 13 turns the flag ON (step C11) and starts a timer (step C13). The timer is used for determination of the lapse of the unit period. Then, the zone setting part 13 sets the each time zone (step C15). Specifically, the latest measurement location is used as the zone center location, associated with the zone radius determined at step C1, and stored in the each time zone data 923. Then, the zone setting part 13 ends the zone setting processing.

On the other hand, if a determination that the flag is ON is made at step C3 (step C3; ON), the zone setting part performs measurement location accumulated averaging processing of accumulatively averaging the measurement locations based on the target period of the above-described accumulated averaging processing (step C17). Then, the zone release part 15 releases the zone set one time ago, and the zone setting part 13 newly sets an each time zone (step C19). Specifically, the average location obtained by the measurement location accumulated averaging processing is used as the zone center location, associated with the zone radius determined at step C1, and updated and stored in the each time zone data 923.

Then, the zone setting part 13 determines whether or not the unit time has elapsed (step C21), and, if a determination that the unit time has elapsed is made (step C21; Yes), the latest each time zone is set to remain as the history zone and the data for the history zone is stored in the accumulated zone data 925 (step C23). Then, the zone setting part 13 resets and starts the timer (step C25), and ends the zone setting processing.

Then, if a determination that the unit time has not elapsed is made (step C21; No), the zone setting part 13 determines whether or not the location skip condition is satisfied (step C27). If a determination that the condition is satisfied is made (step C27; Yes), the zone setting part sets the location skip time zone based on the latest measurement location and stores the zone in the accumulated zone data 925 (step C29). Then, the zone setting part 13 ends the zone setting processing. Further, if a determination that the location step condition is not satisfied is made at step C27 (step C27; No), the zone setting part 13 also ends the zone setting processing.

Returning to the halt continuation determination processing in FIG. 11, the zone setting processing is performed, and then, the halt continuation determination part 11 performs within or without zone determination (step A7). That is, with respect to the respective set zones, the part computes the distance between the center location and the latest measurement location, and compares it with the zone radius. Then, if the computed distance is equal to or less than the zone radius, a determination that the measurement location is within the zone is made.

Then, the halt continuation determination part 11 determines whether or not a zone having the measurement location within the zone exists (step A9), and, if the zone exists (step A9; Yes), determines the location change direction threshold value (step A11). Specifically, the part refers to the location change direction threshold determination data 94 stored in the memory part 90, and reads out and sets the location change direction threshold value 943 in response to the reception signal strength 941 acquired from the GPS module 20.

Then, the halt continuation determination part 11 determines whether or not the approximate direction continuation condition is satisfied using the location change direction threshold value determined at step A11 (step A13). Then, if a determination that the condition is not satisfied is made (step A13; No), halt continuation is judged (step A15).

Then, the halt continuation determination part 11 determines whether or not a location convergence condition is satisfied (step A17). The location convergence condition is a condition showing that the measurement locations converge in a fixed range within the same zone. Specifically, for example, a condition that the measurement locations are contained in the same zone and the event that the distance between the sequential measurement locations in the time sequence is less than a predetermined threshold distance (e.g., five meters) is continued at a predetermined number of times (e.g., three times) or more is defined as the location convergence condition in advance, and the part determines whether or not the location convergence condition is satisfied.

The status in which the measurement locations converge in the fixed range within the same zone is the status in which the reception environment of the GPS satellite signals is good and the correctness of the location measurement is high. Accordingly, if a determination that the location convergence condition is satisfied is made (step A17; Yes), the zone release part 15 releases all of the set zones except that zone (step A19). Further, if a determination that the location convergence condition is not satisfied is made (step A17; No), the process moves to step A29.

On the other hand, if a determination that no zone having the measurement location within the zone exists is made (step A9; No), or if a determination that the approximate direction continuation condition is satisfied is made (step A13; Yes), the halt continuation determination part 11 judges that the device itself is traveling (step A21).

Then, the zone release part 15 releases all of the zones that have been set (step A23) and sets the flag to OFF (step A25). Further, the part resets the counter CT (step A27).

After step A19 or A27, the halt continuation determination part 11 determines whether or not to end the processing (step A29). For example, the part determines whether or not a command to end the computation of the running distance is given by the user via the operation part 40. If a determination that the processing is ended is made (step A29; Yes), the halt continuation determination part 11 ends the halt continuation determination processing.

If a determination that the processing is continued is made (step A29; No), the halt continuation determination part 11 determines the flag (step A31), and, if the flag is ON (step A31; ON), the process returns to step A5. Alternatively, if the flag is OFF (step A31; OFF), the process returns to step A1.

Further, if a determination that the user is not halted, i.e., moving is made at step A1 (step A1; No), the halt continuation determination part 11 resets the counter CT (step A33). Then, the process returns to step A1.

Separately from the halt continuation determination processing in FIG. 11, the travel distance computation part 17 computes the accumulated travel distance of the user as the running distance. If halt continuation is determined in the halt continuation determination processing, the accumulated travel distance is not updated, and, if travel is determined, the accumulated travel distance is updated. Then, the display control part 19 updates the display of the display part 50.

2-4. Advantages

In the running watch 1, the GPS module 20 intermittently measures the location of the mobile unit according to the GPS satellite signals received from the GPS satellite. The zone setting part 13 sets the halt start time zone (first halt determination region) based on the location of the mobile unit when the determination is started by the halt continuation determination part 11. Further, the zone setting part 13 sets the each time zone by accumulated averaging processing (statistical processing) of the measurement results in the past by the GPS module 20. Then, the halt continuation determination part 11 determines whether or not the halt state of the mobile unit is continued using whether or not the location of the mobile unit newly measured by the GPS module 20 is contained any one of the set halt determination regions.

The measurement location at the halt start time is used as the reference location and the zone with the reference location at the center is set, and thereby, even when the measurement location varies near the reference location or the measurement location travels away from the reference location, and then, returns to the vicinity of the reference location, halt continuation of the mobile unit may be reliably determined. Further, the each time zone is updated and set with respect to each one time, and thereby, the zone may be moved to follow the measurement location and the fluctuations of the measurement location may be addressed.

Furthermore, the zone setting part 13 sets the each time zone to remain as the history zone (third halt determination region) at each time when the unit period defined at predetermined time intervals elapses. In this regard, the target period for accumulated averaging processing of the measurement locations is changed to the next unit period at each time when the unit period elapses. With the each time zone set to remain as the history zone as the each time zone set at the end time of the unit period, the history zone is added at each time when the unit period elapses, and thereby, a group of zones (zone group) are formed. When the location measurement is continued based on the satellite signals at a fixed point, there is a tendency that the directions of the variations of the measured locations are relatively the same direction. Accordingly, the group of zones are formed, and thereby, the possibility that the continuation of the halt state may be correctly determined even when the measurement location varies during halt is improved.

Furthermore, the GPS module 20 measures the travel speed of the mobile unit using Doppler of the GPS satellite signals. Then, the module detects satisfaction of the predetermined location skip condition based on the change of the measurement location of the mobile unit and the travel speed of the mobile unit, and sets the location skip time zone (fourth halt determination region) based on the location of the mobile unit measured at the detection. When the location skip occurs, the measurement location momentarily largely changes, and the zones that have been set may not follow the measurement location and erroneous determination of travel may be made. However, if the location skip condition is satisfied, the zone around the measurement location is set, and thereby, the location in which the location skip occurs is basically contained in the zone and a determination of halt continuation may be made.

As the number of captured GPS satellites increases and the positioning environment becomes better, the positioning accuracy becomes higher and the measurement locations converge in a narrower range. Accordingly, in the case where the measurement locations are continuously within the same zone, the set zones except that zone are released, and thereby, the delay of travel determination when the mobile unit starts to travel and the measurement location moves out of the zone may be eliminated.

Further, even in the case where the measurement location is contained in any one of the zones, if the travel directions obtained from the time changes of the measurement location are continuously aligned, it is highly possible that the mobile unit is traveling. Accordingly, even in the case where the newly measured location of the mobile unit is contained in any one of the set zones, if the approximate direction continuation condition is satisfied, the end of the halt state of the mobile unit is judged, and thereby, the erroneous judgment of halt continuation when the mobile unit is traveling may be prevented.

Furthermore, when the reception signal strength is lower, it is possible that the correctness of the location measurement is lower and the measurement location largely varies. Accordingly, as the reception signal strength is lower, the radius of the set zone is set to be larger, and thereby, even when the correctness of the location measurement is lower, the measurement location may be reliably captured in the set zone.

3. Modified Examples

The example to which the invention is applicable is not limited to the above-described example, but changes may be appropriately made without departing from the scope of the invention. As below, the modified examples will be explained.

3-1. Mobile Unit

The mobile unit is not limited to a human, but includes various mobile units such as a bicycle, an automobile, and an electric train. The halt continuation determination of various mobile units may be performed using the halt continuation determination device according to the invention.

3-2. Electronic Apparatus

The halt continuation determination device of the invention may be built in various electronic apparatuses for use. The device may be provided in various electronic apparatuses, not limited to the running watch of the above-described example, but including a cellular phone (including a smartphone), a portable navigation system, a personal computer, a PDA (Personal Digital Assistance), and a pedometer, for example.

Further, in consideration of a wearable small electronic apparatus worn on a predetermined part of a human for use, the apparatus is not necessarily the wristable small electronic apparatus, but may be an upper arm wearable type of small electronic apparatuses worn on the upper arm, for example.

3-3. Satellite Positioning System

The satellite positioning system is not limited to the GPS, but may be a satellite positioning system including a WAAS (Wide Area Augmentation System), a QZSS (Quasi Zenith Satellite System), a GLONASS (GLObal Navigation Satellite System), and a GALILEO.

3-4. Zones

In the above-described embodiment, the explanation that the shape of the set zones is the circular shape has been made, however, the shape of the zone is not necessarily limited to that. For example, rectangular or oval zones may be set. Further, in the above-described embodiment, the explanation that the measurement location is two-dimensionally considered and the two-dimensional zones are set has been made, however, the measurement location may be three-dimensionally considered and three-dimensional zones may be set.

3-5. Statistical Processing

In the above-described embodiment, the explanation that the statistical processing of setting the each time zone by accumulated averaging processing of the past measurement locations has been made, however, the statistical processing is not limited to that. For example, not the simple accumulated averaging, but weighted averaging may be performed with weights on the respective measurement locations. In this case, for example, the weighted averaging may be performed with the larger weights on the newer measurement locations. Further, a histogram of the past measurement locations may be formed, and the representative locations are selected from the regions where the appearance frequencies of the measurement locations are higher and set to the center locations of the each time zones.

3-6. Location Skip Condition

In the above-described embodiment, the occurrence of the location skip has been determined by comparison between the travel distance obtained from the sequential relation between the measurement locations (first travel distance) and the travel distance obtained from the travel speed (second travel distance), however, the location skip condition for determination of the location skip is not limited to that.

Specifically, for example, whether or not the travel direction of the mobile unit obtained from the sequential relation between the measurement locations (hereinafter, referred to as "first travel direction") coincides with the travel direction of the mobile unit measured using Doppler of the satellite signals (hereinafter, referred to as "second travel direction") may be included in the location skip condition. In this case, for example, a determination that the location skip occurs may be made in the case where the first travel direction is deviated from the second travel direction to a certain degree or more in addition to the case where the first travel distance is deviated from the second travel distance to a certain degree or more.

3-7. Determination of Halt Continuation End

In the above-described embodiment, the explanation that, even in the case where the measurement location is contained in the zone, when the predetermined approximate direction continuation condition is satisfied, the determination that the halt state of the mobile unit has ended is made has been made. However, it is also conceivable that, although the mobile unit is halted, the measurement location varies in a certain direction, and the approximate direction continuation condition is satisfied. Accordingly, it is preferable that the approximate direction continuation condition is not used singly, but conditions of the travel speed and the travel distance of the mobile unit may be added for comprehensive judgment as to whether or not the halt state of the mobile unit has ended.

What is claimed is:

1. A halt continuation determination method, comprising:
   intermittently measuring a location of a mobile unit based on a satellite signal;
   determining whether the mobile unit is halted based on the location of the mobile unit intermittently measured via the satellite signal;
   setting a first halt determination region, in response to a determination that the mobile unit is halted, wherein the first halt determination region is based on the location of the mobile unit when it was determined the mobile unit is halted and the first halt determination region is set as a first area around a first center and defined by a first radius extending from the center;
   setting a second halt determination region after a predetermined time has lapsed since the mobile unit is determined as halted and remains halted, wherein the second halt determination region is set as a second area around a second center and defined by a second radius extending from the second center, and the second halt determination region is different from the first halt determination region and overlaps with the first halt determination region;
   updating the second halt determination region by statistically processing results of the measuring of the location of the mobile unit taken since the determination that the mobile unit is halted and remains halted; and
   determining that the mobile unit is no longer halted when a newly measured location of the mobile unit is outside of the first halt determination region and the second halt determination region; and
   determining that the mobile unit continues to be halted when the newly measured location of the mobile unit is in any one of the first halt determination region and the second halt determination region.

2. The method according to claim 1, wherein the updating the second halt determination region includes updating the second halt determination region by performing the statistical processing of results of the measuring in a given period retroactively from a time of the updating.

3. The method according to claim 2, wherein the second halt determination region updated at a given time is set to remain as a third halt determination region.

4. The method according to claim 3, wherein the updating the second halt determination region includes changing a target period of the statistical processing at each time when the time comes.

5. The method according to claim 1, wherein the measuring includes measuring a travel speed of the mobile unit using Doppler of the satellite signal,
   further comprising:
   detecting a result of the measuring that does not satisfy an adaptation condition showing that a change of the location of the mobile unit and the travel speed of the mobile unit are adaptable to each other; and
   setting a fourth halt determination region based on the location of the mobile unit detected at the detecting.

6. The method according to claim 1, wherein the determining includes:

if the newly measured location of the mobile unit is contained in any one of the first halt determination region and the second halt determination region, and an approximate direction continuation condition showing that directions of location changes of the mobile unit based on the results of the measuring are aligned in a predetermined period is satisfied, judging that the halt state of the mobile unit is ended; and if the newly measured location of the mobile unit is contained in any one of the set halt determination regions and the approximate direction continuation condition is not satisfied, judging that the halt state of the mobile unit in continued.

7. The method according to claim 1, further comprising changing a size of the first halt determination region or a size of the second halt determination region using a reception signal strength of the satellite signal.

8. The method according to claim 1, further comprising, in the case where the halt state of the mobile unit is determined to be continued by the determining, if the measured locations of the mobile unit converge in a predetermined range within a predetermined halt determination region included in the first halt determination region or the second halt determination region, releasing the other set halt determination region than the predetermined halt determination region.

9. A halt continuation determination device comprising:
a measurement unit that intermittently measures a location of a mobile unit based on a satellite signal;
a first setting unit that sets a first halt determination region based on the location of the mobile unit when a halt determination, in which the mobile unit is determined as being in a halt state, is made, wherein the first halt determination region is set as a first area around a first center and defined by a first radius extending from the center;
a second setting unit that sets and updates a second halt determination region by statistically processing measurement results of the location of the mobile unit taken since the halt determination, wherein the second halt determination region is set after a predetermined time has lapsed since the mobile unit is determined as halted and remains halted, the second halt determination region is set as a second area around a second center and defined by a second radius extending from the second center, and the second halt determination region is different from the first halt determination region and overlaps with the first halt determination region; and
a determination unit that determines whether or not a halt state of the mobile unit is continued based on whether or not a location of the mobile unit newly measured by the measurement unit is contained in any one of the first halt determination region and the second halt determination region.

10. The method according to claim 1 wherein the location of the mobile unit at a time when the mobile unit is determined to be halted is set as the first center of the first halt determination region.

11. The method according to claim 1 wherein the updating of the second halt determination region by statistical processing further comprises:
determining an average location measurement of the mobile unit, wherein the average location measurement of the mobile unit is set as the second center of the second halt determination region.

12. The halt continuation determination device according to claim 9 wherein the first setting unit sets the location of the mobile unit at a time when the mobile unit is determined to be halted as the first center of the first halt determination region.

13. The halt continuation determination device according to claim 9 wherein the second setting unit determines an average location measurement of the mobile unit and sets the average location measurement of the mobile unit as the second center of the second halt determination region.

14. The method according to claim 1 further comprising:
determining a location change direction, wherein the location change direction is determined based on a difference between two consecutive locations measured; and
comparing the location change direction to a location change threshold to determine whether an approximate direction continuation condition is satisfied, wherein the location change threshold is inversely proportional to a reception signal strength of the satellite signal such that, as the reception signal strength decreases, the location change threshold increases.

15. The method according to claim 7, wherein the reception signal strength of the satellite signal is inversely proportional to a length of the first radius of the first halt determination region or a length of the second radius of the second halt determination region such that, as the reception signal strength decreases, the length of the first radius or the length of the second radius increases.

16. The halt continuation determination device according to claim 9 wherein:
the first setting unit changes a size of the first halt determination region based on a reception signal strength of the satellite signal; and
the second setting unit changes a size of the second halt determination region based on the reception signal strength of the satellite signal.

17. The halt continuation determination device according to claim 16 wherein the reception signal strength of the satellite signal is inversely proportional to a length of the first radius of the first halt determination region and a length of the second radius of the second halt determination region such that, as the reception signal strength decreases the length of the first radius or the length of the second radius increases.

* * * * *